US008668765B2

(12) United States Patent
Dewald, III et al.

(10) Patent No.: US 8,668,765 B2
(45) Date of Patent: Mar. 11, 2014

(54) DRYER HAVING STRUCTURE FOR ENHANCED DRYING EFFICIENCY AND METHOD OF USE

(75) Inventors: Charles Robert Dewald, III, Morristown, TN (US); Thomas L. Cristello, West Orange, NJ (US)

(73) Assignee: Protege Enterprises, Union, NJ (US)

( * ) Notice: Subject to any disclaimer, the term of this patent is extended or adjusted under 35 U.S.C. 154(b) by 131 days.

(21) Appl. No.: 13/422,289

(22) Filed: Mar. 16, 2012

(65) Prior Publication Data

US 2012/0227279 A1 Sep. 13, 2012

Related U.S. Application Data

(63) Continuation-in-part of application No. 12/073,991, filed on Mar. 12, 2008, now Pat. No. 8,137,440, which is a continuation-in-part of application No. 11/797,941, filed on May 9, 2007, now Pat. No. 7,785,398.

(51) Int. Cl.
*B01D 53/02* (2006.01)

(52) U.S. Cl.
USPC .................. 95/113; 95/106; 95/134; 95/146; 34/77; 34/80; 34/86; 34/472; 34/473

(58) Field of Classification Search
USPC ............ 95/106, 113, 134, 146; 34/77, 80, 86, 34/472, 473
See application file for complete search history.

(56) References Cited

U.S. PATENT DOCUMENTS

| | | | |
|---|---|---|---|
| 2,186,844 A | 1/1940 | Smith | |
| 2,700,537 A | 1/1955 | Pennington | |
| 2,926,502 A | 3/1960 | Munters et al. | |
| 3,398,510 A | 8/1968 | Pennington | |
| 4,180,985 A | 1/1980 | Northrup, Jr. | |
| 4,594,860 A | 6/1986 | Coellner et al. | |
| 4,982,575 A | 1/1991 | Besik | |
| 5,172,489 A | 12/1992 | Moller | |
| 5,343,632 A | 9/1994 | Dinh | |
| 5,353,606 A | 10/1994 | Yoho et al. | |
| 5,502,975 A | 4/1996 | Brickley et al. | |
| 5,517,828 A | 5/1996 | Calton et al. | |
| 5,937,667 A | 8/1999 | Yoho, Sr. | |
| 6,094,835 A * | 8/2000 | Cromer | 34/80 |

(Continued)

FOREIGN PATENT DOCUMENTS

| | | |
|---|---|---|
| GB | 2217824 A | 11/1989 |
| GB | 2369422 A | 5/2002 |

(Continued)

OTHER PUBLICATIONS

International Search Report, dated Jul. 15, 2008, issued in PCT/US2007/025573.

*Primary Examiner* — Christopher P Jones
(74) *Attorney, Agent, or Firm* — William F. Nixon

(57) ABSTRACT

A drying system includes a desiccant wheel that dries incoming air. The dried air is heated using a heating element to promote drying of an article within the drying system. A portion of the heated air is diverted to a secondary air path that leads away from the drum holding the article. The diverted portion is used to regenerate an area of the desiccant wheel. A secondary heating element is used to promote regeneration and located in the secondary air path.

17 Claims, 6 Drawing Sheets

(56) References Cited

U.S. PATENT DOCUMENTS

| | | | |
|---|---|---|---|
| 6,178,762 B1 | 1/2001 | Flax | |
| 6,328,095 B1 | 12/2001 | Felber et al. | |
| 6,355,091 B1 | 3/2002 | Felber et al. | |
| 6,575,228 B1 | 6/2003 | Ragland et al. | |
| 6,751,964 B2 | 6/2004 | Fischer | |
| 6,780,227 B2 | 8/2004 | DuBose et al. | |
| 6,959,875 B2 | 11/2005 | Yabu et al. | |
| 7,166,149 B2 | 1/2007 | Dunne et al. | |
| 7,326,277 B1 * | 2/2008 | Cohen et al. | 95/113 |
| 7,338,548 B2 * | 3/2008 | Boutall | 95/14 |
| 7,431,900 B2 | 10/2008 | Hill et al. | |
| 7,785,398 B2 | 8/2010 | Dewald, III et al. | |
| 7,886,986 B2 | 2/2011 | Fischer, Jr. et al. | |
| 7,908,766 B2 | 3/2011 | Ahn et al. | |
| 2002/0071979 A1 | 6/2002 | DuBose et al. | |
| 2003/0164091 A1 | 9/2003 | Hill et al. | |
| 2004/0000152 A1 | 1/2004 | Fischer | |
| 2004/0262408 A1 | 12/2004 | Yabu et al. | |
| 2005/0150378 A1 | 7/2005 | Dunne et al. | |
| 2005/0217481 A1 * | 10/2005 | Dunne et al. | 95/113 |
| 2007/0028769 A1 | 2/2007 | Eplee et al. | |
| 2008/0034608 A1 | 2/2008 | Ahn et al. | |
| 2008/0108295 A1 | 5/2008 | Fischer et al. | |
| 2008/0276802 A1 | 11/2008 | Dewald, III et al. | |
| 2009/0205220 A1 | 8/2009 | Dewald, III et al. | |

FOREIGN PATENT DOCUMENTS

| | | |
|---|---|---|
| JP | 60-119992 A | 6/1985 |
| JP | 2007-222455 A | 9/2007 |
| WO | 93/21489 A1 | 10/1993 |
| WO | 2005/012624 A1 | 2/2005 |
| WO | 2006/062262 A1 | 6/2006 |
| WO | 2007094741 A1 | 8/2007 |

* cited by examiner

DRYER HAVING STRUCTURE FOR ENHANCED DRYING EFFICIENCY AND METHOD OF USE

CROSS-REFERENCE TO RELATED APPLICATIONS

This application is a Continuation-In-Part of U.S. patent application Ser. No. 12/073,991, filed on Mar. 12, 2008, and issued as U.S. Pat. No. 8,137,440 B2, which claims the benefit of U.S. patent application Ser. No. 11/797,941, filed on May 9, 2007, and issued as U.S. Pat. No. 7,785,398 B2 on Aug. 31, 2010, both of which are hereby incorporated by reference.

FIELD OF THE INVENTION

The present invention relates to a dryer using heated air to dry items. More particularly, the present invention relates to a dryer and structure to enhance moisture removal from items within the dryer having a three-hole or four-hole configuration utilizing a desiccant wheel in an open system.

DISCUSSION OF THE RELATED ART

Dryers essentially work in the following manner. A dryer draws air from a surrounding area, and heats the air using a heating element. The heated air passes into a drum holding clothes or other items. The heated air evaporates moisture from the clothes or items within the drum. The dryer then expels the moist air from the drum to the outside. A vent connected to the dryer may help in expelling the moist air to the outdoors.

Articles, such as clothes, towels, rugs and the like, take a certain amount of time to dry. The amount of time varies according to the article being dried and the parameters designed into the dryer. Such factors include energy capacity of the heating element, efficiency of heat transfer, air flow capacity, vapor pressure of the air, and the like. Some of these factors may be beyond the control of the dryer.

A conventional dryer uses the vapor pressure and relative humidity of the air in the home, laundry room, basement and the like, which usually is less than desirable for drying articles. The grains of moisture in a home or room may range from about 45 grains to about 110 grains of water vapor (molecules) per pound of air (grains/lb). Grains of water vapor per pound of air indicate the density measurement of water vapor in the air. By measuring the volume of air, an average number of grains of water vapor for the volume may be determined. The relative humidity in a home may range from 40% to 65%.

Conventional dryers use a fixed amount of airflow, shown in cubic feet per minute ($ft^3$/min) (hereinafter "CFM"), and a fixed heating capacity provided by the heating element (in watts or btu/hr) to increase the temperature of the air used for drying. Dryers pull in ambient air and heat it up before blowing it into the drum to dry clothes. Conditions for the ambient air may be 75 degrees F. and 50% relative humidity with 65 grain of water/pound (or a vapor pressure of 0.445 inHg). The temperature increase provided by the drying may be calculated using the CFM and wattage capacity of the heating element of the dryer using the following equation:

$$((\text{CFM}\times 60\ \text{m/hr})/Sv)\times(0.24\ \text{Btu/lb-}^\circ\text{ F.})\times(\Delta\text{Temp})=\text{Wattage}\times 3.4\ (\text{Btu/W-hr}). \quad \text{Equation 1:}$$

By plugging in the specific designed airflow (CFM) and wattage from the heating element, the temperature increase achieved by the dryer over ambient air conditions may be calculated. This relationship may be shown as:

$$[(\Delta\text{Temp}]=(\text{Wattage}(3.4\ \text{Btu/W-hr}))/((\text{CFM}*60\ \text{m/hr})(0.24\ \text{Btu/lb-}^\circ\text{ F.}). \quad \text{Equation 2:}$$

When the temperature is raised after going across the heating element to this amount, the relative humidity of the air decreases by a specific and calculable amount as well. Conventional dryers, thus, use the amount of water in the air, or vapor pressure, at the ambient conditions in combination with the increased temperature to dry clothes.

Under these constraints, improved drying is provided by increasing the wattage used the heating element, which in turns uses more power, or the increase the airflow of the dryer while not decreasing the inlet drum temperature. Increasing the airflow may not be feasible for existing dryer configurations as they would become too unwieldy or big. Moreover, large blowers would be needed to bring in the larger amounts of air, which also uses more power. Thus, conventional dryers are stuck with finding small changes to produce the highest drum temperature possible at the highest volume possible to improve drying efficiency.

SUMMARY OF THE INVENTION

The disclosed embodiments of the present invention relate to a dryer apparatus and associated methods that improve drying efficiency and reduce the amount of time needed to dry articles. The dryer removes moisture from the air prior to entering the drum, tumbler or housing. Thus, the condition of the air as related to moisture is improved, while not sacrificing or lowering the inlet drum temperature or the volume of air moving through the drum within the dryer.

The disclose embodiments use the combination of existing airflow and heating elements within conventional dryer to improve drying efficiency, or produce a higher efficiency rating. The disclosed embodiments accomplish the increase in drying efficiency by implementing the configurations shown in the accompanying figures and disclosed below. The disclosed embodiments place a desiccant wheel in the main intake airstream that removes moisture from the ambient air before it enters a drum. The disclosed embodiments reduce the grains per pound, or vapor pressure/relative humidity, of the air.

According to the disclosed embodiments, a dryer is configured to increase efficiency by either using ambient air in a four-hole configuration to regenerate the desiccant wheel or using the pre-heated and dried air after the air goes through the desiccant wheel on the main air intake process to regenerate the desiccant using a three-hole configuration. These configurations also may use a smaller regeneration heating element to further dry or heat the air before it regenerates the desiccant wheel.

The configurations disclosed below provide improved drying efficiency utilizing a three-hole or four-hole system. Various heating elements, or just the primary heating element, may be used to pre-heat air before it regenerates the desiccant wheel.

A drying system is disclosed. The drying system includes an air intake stream having ambient conditions of air from outside the drying system. The drying system also includes a desiccant wheel to remove water or moisture from the air intake stream. The drying system also includes a heating element to heat the air intake stream. The drying system also includes a secondary air path to divert a portion of the heated air intake stream. The drying system also includes an area of the desiccant wheel to receive the diverted portion to regenerate desiccant within the portion.

A method for drying an article within an open drying system also is disclosed. The method includes drawing in outside air through a desiccant wheel to generate dried air. The method also includes heating the dried air with a heating element to generate heated air. The method also includes separating the heated air with an adjusting means to form a secondary air path. The method also includes regenerating the desiccant wheel with the heated air within the secondary air path.

A method for operating an open drying system also is disclosed. The method includes taking in outside air into the open drying system. The method also includes drying the outside air with a desiccant wheel to generate dried air. The method also includes heating the dried air with a heating element to generate heated air. The method also includes separating the heated air into a first air path and a second air path. The method also includes flowing the heated air of the first air path to a drum within the open drying system. The method also includes flowing the heated air of the second air path to an area of the desiccant wheel. The method also includes regenerating the desiccant wheel with the heated air of the second air path. The method also includes exiting exhaust air from the desiccant wheel from the open drying system.

A method for recouping heat energy in a drying system also is disclosed. The method includes taking in air. The method also includes drying the air using desiccant. The method also includes heating the dried air to add heat energy. The method also includes diverting the dried and heated air to a secondary air path. The method also includes regenerating the desiccant using the dried and heated air. The method also includes transferring the heat energy to the desiccant.

BRIEF DESCRIPTION OF THE DRAWINGS

The accompanying drawings are included to provide further understanding of the invention and constitute a part of the specification. The drawings listed below illustrate embodiments of the invention and, together with the description, serve to explain the principles of the invention, as disclosed by the claims and their equivalents.

DETAILED DESCRIPTION OF THE PREFERRED EMBODIMENTS

Figure 1:
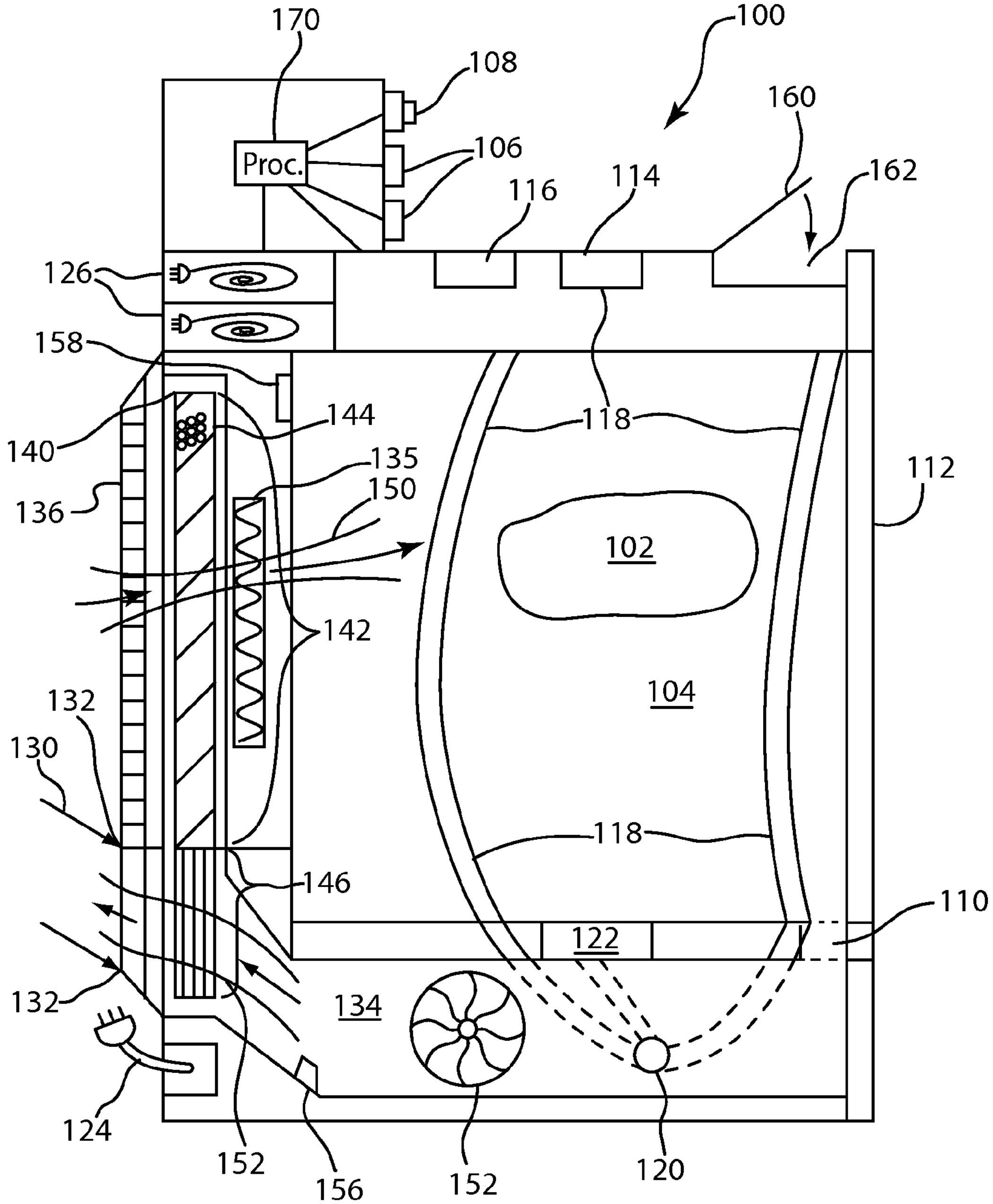
FIG. 1 illustrates a dryer having a desiccant wheel configuration according to the disclosed embodiments.

Aspects of the invention are disclosed in the accompanying description. Alternate embodiments of the present invention and their equivalents are devised without parting from the spirit or scope of the present invention. It should be noted that like elements disclosed below are indicated by like reference numbers in the drawings.

Three main factors may impact an efficiency rating of a dryer. One factor may be the airflow, such that the more airflow pulled through the dryer results in a more efficient drying rating, if all other factors remain constant. Increased air results in better drying efficiency.

Another factor may be the temperature of the air as it enters the drum. A more efficient rating results from a higher temperature of the air going into the drum of the dryer, if the other factors remain constant. Another factor may be the humidity ratio, relative humidity, or vapor pressure of the air as it enters the drum. A lower humidity ratio, relative humidity or vapor pressure for the air results in increased drying efficiency, if the other factors remain constant.

FIG. 1 depicts a dryer 100 having a desiccant wheel 140 according to the disclosed embodiments. Dryer 100 is a dryer using forced, heated air to remove moisture and wetness from articles, such as clothes, towels, rugs, sheets, dishes, and the like. Article 102 represents one or more of such articles, or even a plurality of different articles, within dryer 100. Preferably, article 102 is contained or held, within a rotating drum 104. For example, article 102 may tumble within drum 104 to allow the heated air to flow over its surface to remove moisture.

Dryer 100 intakes outside air from its surrounding environment and expels the air after it has cycled through drum 104. This process is disclosed in greater detail below. Dryer 100 also includes controls 106 to adjust settings and operations for drying articles. Controls 106 may be knobs, buttons, displays, touch screens, keypads and the like. Indicator 108 alerts a user that an issue has arisen within dryer 100, such as lint screen 110 needs cleaning, or a drying cycle is completed. Preferably, indicator 108 is a light.

Dryer 100 also includes door 112. FIG. 1 shows door 112 on the front side of dryer 100, but door 112 may be located on any side or the upper surface of dryer 100. For example, door 112 may be located on the top of dryer 100 is that location is considered more convenient or accessible. Drum 104 holds article 102. Article 102 is placed in and removed via door 112. Thermostat 114 may control the temperature in drum 104 and uses information provided by sensor 116 to determine whether to increase or decrease the amount of heated air flowing into drum 104.

Belts 118 rotate drum 104. FIG. 1 shows two belts 118, but the number of belts may vary according to the needs and size of dryer 100. Moreover, other means for rotating drum 104 can be employed, and dryer 100 is not limited to using belts. Belts 118 may be attached to a rotor 120. Rotor 120 is controlled by motor 122, which receives commands from controls 106. Again, rotor 120 and motor 122 may be any configuration known in the art.

Power cord 124 provides the power to dryer 100. Preferably, power cord 124 includes a 220 volt plug that interacts with a wall outlet. Alternatively, power may be supplied through two (2) 110 volt plugs 126 also stored within dryer 100. Plugs 126 may be used instead of the 220 volt plug.

Dryer duct 130 couples exhaust passage 134 of dryer 100 to the outside. Preferably, duct 130 connects to a vent within a wall. Duct 130 may be coupled to dryer 100 using clips 132. Duct 130 may be comprised of rigid material that can be shaped to flow the air in a desired direction.

Lint screen 110 separates drum 104 from exhaust passage 134. Exhaust passage 134 allows air from drum 104 to exit dryer 100 through duct 130. Fan 154 may be optional, and draws the air into exhaust passage 134. Lint screen 110 removes dirt, fluff, particles, lint and the like from the drawn air such that exhaust passage 134 does not become clogged.

Dryer 100 also uses inlet opening 136 to allow air to flow into drum 104. Inlet opening 136 may include small openings to keep foreign objects and materials out of dryer 100. Further, inlet opening 136 may be attached to a duct connecting dryer 100 with the outside air. Desiccant wheel 140 is configured between inlet opening 136 and heating element 135, which provides heated air to drum 104. The heated air is used to dry article 102.

Heating element 135 may be a heater or other device known in the art for heating forced air. In other words, heating element 135 may be any device that increases the ambient temperature of the air drawn through inlet opening 136. Heating element 135 may use electrical, microwave, infrared or other technologies to increase the temperature of the air. Heating element 135 also may be known as the primary heating element of dryer 100. Temperatures attainable by heating element 135 may vary according to the desired operation of dryer 100.

Desiccant wheel 140 includes compartments filled with desiccant 144. Desiccant 144 preferably are silica gel pellets. Alternatively, other silica gel products may be used in conjunction with wheel 140. Further, other desiccants may be used as desiccant 144, such as activated charcoal, calcium sulfate, calcium chloride, montmorillonite clay, molecular sieves and the like. Desiccant 144 removes water molecules or moisture from the incoming air. This action reduces the vapor pressure and increases the drying capacity of the incoming air. Thus, the grains of water vapor are reduced in the volume of air entering dryer 100.

The air flows through desiccant wheel 140 at portion 142. Portion 142 includes the part of desiccant wheel 140 that removes water from the incoming air using desiccant 144. Because some of the water vapor of the incoming air will attach to desiccant 144, the air flowing into drum 104 is lower in vapor pressure to dry article 102 more efficiently. If the vapor pressure of the incoming air is reduced with the airflow and temperature staying constant, then article 102 dries faster or uses less energy during the same time period. The drying process for dryer 100 consumes fewer resources because less energy is needed to evaporate water from article 102.

For example, if the vapor pressure of the incoming air is reduced to about 10 to 40 grains/lb, then article 102 would have a reduced average drying time as a result. Thus, less energy needs to be supplied to heating element 135 and less power to rotate drum 104 in drying article 102.

As shown in FIG. 1, portion 142 of desiccant wheel 140 is positioned to receive the incoming air shown by main intake air path 150. Main intake air path 150 represents all the incoming air flowing through inlet opening 136. Main intake air path 150 also includes air from other parts of dryer 100, such as the front or sides, and is not limited to the air coming through inlet opening 136. Main intake air path 150 also flows through portion 142 of desiccant wheel 142 and heating element 135 into drum 104. As noted above, the air within main intake air path 150 reacts with desiccant 144 to remove moisture from the air.

Portion 146 of wheel 140 is positioned by exhaust passage 134 to be exposed to air flowing from drum 104 to duct 130. Exhaust air path 152 represents the air expelled from drum 104. Exhaust air path 152 also flows through portion 146. Preferably, portion 146 is a lower part of wheel 140.

The air within exhaust air path 152 may regenerate desiccant 144 within portion 146. Desiccant 144 absorbs the heat from the air within exhaust air path 152. The air of exhaust air path 152 may be hot because it flows from heating element 135 and drum 104. This hot air may burn off water vapor from desiccant 144 within portion 146 that was absorbed in portion 142. By doing this procedure, desiccant 144 can absorb more water vapor when it is moved back to position 142.

Dryer 100 also includes sensors or other information gathering devices to indicate temperatures, vapor pressure, air flow and the like. This information may be forwarded to a processor 170. Processor 170 controls operations of dryer 100 and is coupled to controls 106. Processor 170 may execute steps or commands from a list of code or instructions stored within a memory coupled therewith.

Sensor 158 may be located in the vicinity of main intake air path 150 to determine the temperature of air flowing into drum 104. Based on the need of drum 104, processor 170 can adjust heating element 135 to a desired temperature so that the air in main intake air path 150 enters drum 104 at the desired temperature. Sensor 158 also may detect the moisture of the air coming into drum 104.

Sensors also may determine the status for other parts of dryer 100, such as door 112 being opened. The sensors may comprise any known device used to determine temperature, vapor pressure or other parameters from an environment. Sensors 156 and 158 are thermometers that simply relay a temperature reading. Alternatively, sensors 156 and 158 can determine vapor pressure, air speed or flow, humidity and the like of the air. Sensors 156 and 158 provide valuable feedback on operating dryer 100 and preventing injury to a user. For example, a blast of hot air through door 112 could harm a user, as well as ruin article 102 due to overexposure to hot air.

Dryer 100 also includes small door 160 to opening 162. Opening 162 accommodates dryer sheets, fabric softener and the like placed into drum 104.

Figure 2:
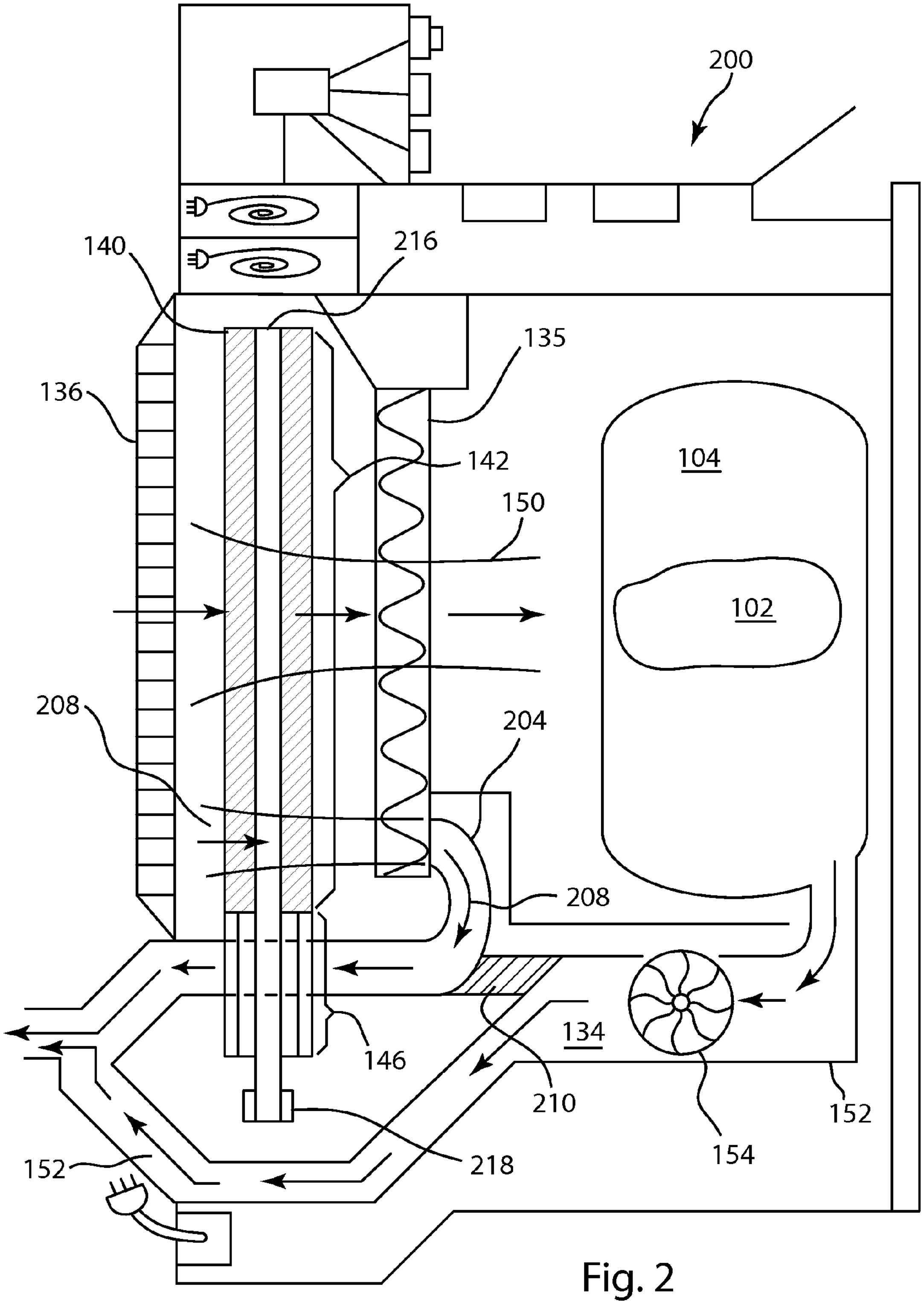
FIG. 2 illustrates a dryer having another desiccant wheel configuration according to the disclosed embodiments.

FIG. 2 depicts another configuration for a dryer 200 according to the disclosed embodiments. This configuration also uses desiccant wheel 140 to remove moisture from incoming air before being heated by heating element 135. Dryer 200 includes many of the same elements as dryer 100 disclosed above, and those elements are not repeated here. Dryer 200, however, does include different elements in its configuration.

Desiccant wheel 140 includes portions 142 and 146. Portion 142 receives main intake air path 150 through inlet opening 136. The air is heated by heating element 135. Also shown in FIG. 2 are belt 216 and motor 218 to move desiccant wheel 140 so that desiccant 144 moves between positions 142 and 146.

While desiccant 144 is in position 146, it is regenerated by the configuration of dryer 200. A secondary, or reactivation, intake air path 208 also flows through portion 142 and heating element 135. Secondary intake air path 208, however, is diverted from entering drum 104 by regeneration passage 204 to flow through portion 146. Thus, dry, heated air is brought directly to regenerate desiccant wheel 140. This configuration avoids using hot and possibly moist air from drum 104.

Separating part 210 prevents exhaust air path 152 from flowing into desiccant wheel 140 and keeps this air separate from the air in secondary intake air path 208. Exhaust air path 152 and secondary intake air path 208 may be combined to exit dryer 200.

Thus, according to dryer 200, desiccant 144 is regenerated in a more efficient manner, thereby resulting in a more efficient drying process. Desiccant wheel 140 is regenerated directly with hot, dry air in secondary intake air path 208. Only a portion of the incoming air is diverted in such a manner.

Figure 3:
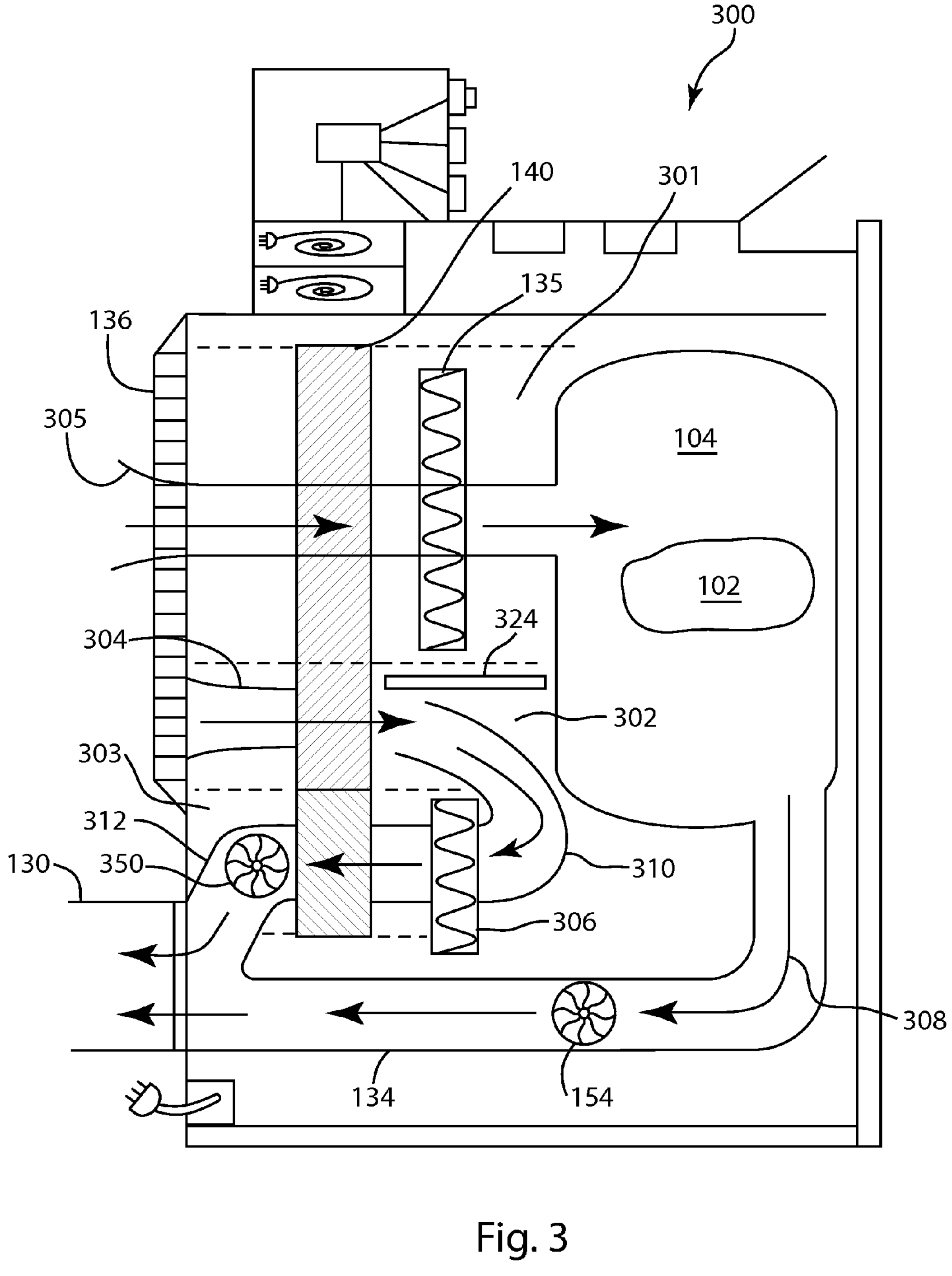
FIG. 3 illustrates a dryer having a three-hole path configuration according to the disclosed embodiments.

FIG. 3 depicts a dryer 300 having another configuration according to the disclosed embodiments. Instead of using ambient air from outside, dryer 300 uses pre-heated and dried air after it goes through desiccant wheel 140 on the main intake process airstream to regenerate wheel 140 with a separate smaller heating element in the regeneration airstream. Thus, desiccant wheel 140 may be broken into three (3) areas or compartments. This configuration may be called a three-hole configuration. These areas correspond with the air flows that go through desiccant wheel 140.

Dryer 300, however, brings in air for all the processes disclosed below in the same intake. Thus, even though the air flows are shown differently, the air generally comes from outside air through inlet openings 136.

The first area 301 of desiccant wheel 140 may be known as the main intake air path 305, or process intake, that draws in air to heat and dry articles in drum 104. Heating element 135 heats this air, as it enters drum 104. The heated air evaporates the water from article 102. The heated, moist air exits drum 104 as exhaust air path 308 through exhaust passage 134.

The airflow for first area 301, or main intake air path 305, is corresponds to the airflow of a conventional dryer. In other words, dryer 300 draws the same cubic feet per minute as normal dryers. Further, the power used to heat the air with heating element 135 corresponds with the power requirements of most normal dryers.

Another air path flows off desiccant wheel 140, as shown by secondary intake air path 304 and correlating with second area 302 of desiccant wheel 140. As noted above, secondary intake air path 304 comes from main intake air path 305 that flows through desiccant wheel 140. Air paths 305 and 304 are shown separately for illustrative purposes in FIG. 3. A damper 324 may be included to separate air paths 304 and 305 as they exit desiccant wheel 140.

Secondary intake air path 304 is diverted from heating element 135 by duct 310. Duct 310 directs secondary intake air path 304 to secondary heating element 306. Secondary heating element 306 heats the air to a temperature higher than the ambient temperature based on wattage and airflow. Further, because the air within secondary intake air path 304 is dried by desiccant wheel 140, it also drier than the typical ambient air from outside dryer 300. Using the above example, this air may be reduced from 65 gpp to about 15 to 25 gpp, or even lower.

This warmer, drier air flows through duct 310 back through desiccant wheel 140. Secondary intake air path 304 now dries out desiccant 144, which has absorbed moisture and water vapor while in position 140, or within first area 301. This flow of air may be known as third area 303, and differs from first area 301 and second area 302 because the air flows in a different direction through third area 303. In other words, the air within third area 303, as shown by secondary intake air path 304, flows back towards the outside of dryer 300, or in the opposite direction of main intake air path 305.

This reverse air flow relationship allows desiccant 144 to be regenerated using drier, warmer air instead of the air flowing from drum 104. Because desiccant 144 is dried using this configuration, it is drier while interacting with the incoming air, such main intake air path 305 and secondary intake air path 304. Thus, the incoming air is even drier and warm after being heated by secondary heating element 306, which means warmer and drier air to regenerate desiccant wheel 140. This cycle may establish a positive feedback loop to improve drying efficiency within dryer 300.

Secondary heating element 306 also allows the heating of the air to be adjusted as needed. Secondary heating element 306 may be turned on and off as needed, or according to a process programmed into dryer 300. Dryer 300 may detect a condition that warrants additional heating capacity, and thus, turns on secondary heating element 306. Alternatively, dryer 300 may not include a secondary heating element 306.

After flowing through desiccant wheel 140, secondary intake air path 304 merges with exhaust air path 308 to exit dryer 300, as shown by exhaust duct 312. Secondary exhaust fan 350 may be located in exhaust duct 312 to help pull air through desiccant wheel 140. Thus, all the moist, wet air from drum 104 and from regenerating desiccant wheel 140 is moved out of dryer 300. Duct 130 may move this air to outside the house or room housing dryer 300. Thus, only one exhaust port may be used during this process.

Dryer 300, when using the same wattage (power) and air flow as conventional dryers, increases drying efficiency. Temperatures in drum 104 are higher despite these same parameters using the configuration disclosed above. This effect is achieved by the heat exchange properties of desiccant wheel 140 as well as the positive feedback loop of dryer 300.

Due to the increased efficiency, dryer 300 results in warmer air going into drum 104 while having the same airflow and using the wattages. The overall efficiency of the drying process is increased substantially. Thus, clothes will dry much faster the conventional dryers with an efficiency rating about 20-35% higher without the need for increased power or airflow through dryer 300.

Figure 4:
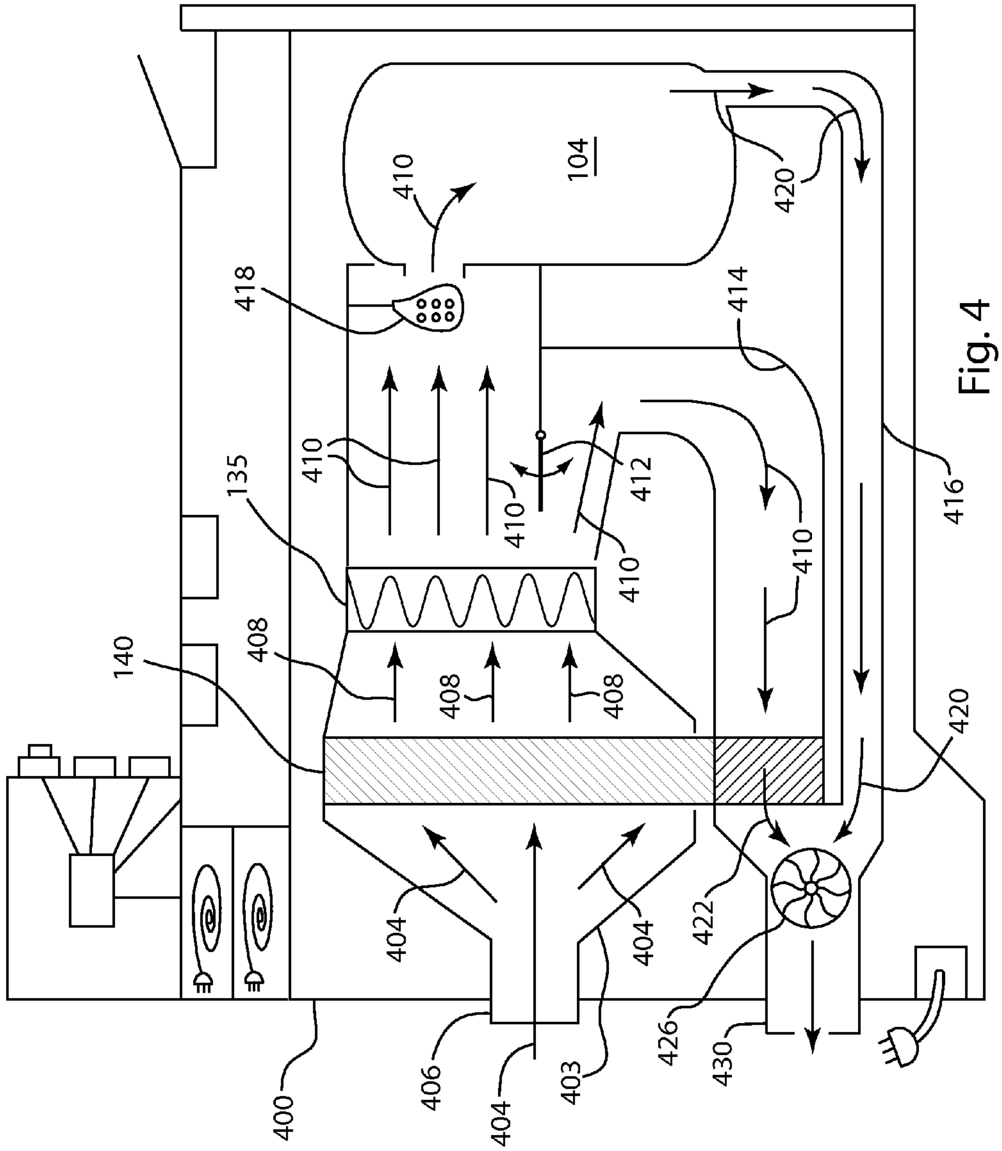
FIG. 4 illustrates a dryer having another three-hole path configuration according to the disclosed embodiments.

FIG. 4 depicts a dryer 400 having another three-hole configuration according to the disclosed embodiments. Dryer 400 may include the features of the dryers disclosed above, but has a slightly different configuration that dryer 300. For example, air may enter dryer 400 through intake duct 406. Dryer 400 also may not include a secondary heater, and may use exhaust fan 426 to draw the exhaust air from drum 104 and the secondary air path through desiccant wheel 140.

Dryer 400 includes drum 102, desiccant wheel 140 and heating element 135. These components may execute the same functions as disclosed above. Drum 104 rotates and is the compartment to dry articles. Desiccant wheel 140 removes water or moisture to incoming air, and heating element 135 heats that air.

Referring to FIG. 4, dryer 400 draws in intake air 404 through intake duct 406 into main intake air path 403. As dryer 400 is an open system, this air may be outside dryer 400, and, preferably, from outside a building or room housing dryer 400. Intake air 404 then passes, or flows, through desiccant wheel 140. Water molecules are removed in order to decrease the relative humidity or vapor pressure of intake air 404. This process generates dried air 408, which flows to heating element 135.

Heating element 135 heats dried air 408 to generate heated air 410. As shown, a portion of heated air 410 may be diverted into secondary air path duct 414. Most of heated air 410, however, flows into drum 104 through drum vent 418. Drum vent 418 also may include a screen to remove lint, dust or other debris from entering drum 104. This heated air is used to dry clothes, towels, and the like within drum 104.

The diverted portion of heated air 410 flows through duct 414 towards desiccant wheel 140. Preferably, about a quarter, or 25%, of heated air 410 is diverted. This amount may be adjustable using damper 412. Damper 412 may rotate about an axis to open and close the flow of air into duct 414. For example, damper 412 may rotate to close a portion of duct 414 so that about 10% of heated air 410 flows towards desiccant wheel 140. Alternatively, damper 412 may be removed so that a constant flow of heated air is routed towards desiccant wheel 140, with the percentage of diverted heated air corresponding to the size of the opening to duct 414.

For example, the flow of air coming into dryer 400 may be about 140 CFM ($ft^3$/min). The entire air flow passes through desiccant wheel 140 to become dried air 408, and through heating element 135 to become heated air 410. The majority of the air at 105 CFM is routed towards drum 104. A smaller, or weaker, air flow of 35 CFM is routed back to desiccant wheel 140 via duct 414. Thus, not all of the 140 CFM flows into drum 104, but the better drying conditions provided by the disclosed embodiments allow for the smaller air flow to still be more efficient in drying.

Heated air 410 then passes through desiccant wheel 140 in an opposite direction of the intake air path. The heated air regenerates desiccant wheel 140 by removing moisture or water from the desiccant within wheel 140, as disclosed above. The air flow through wheel 140 is generated by exhaust fan 426. Once through desiccant wheel 140, this air becomes regeneration exhaust air path 422.

Exhaust air 420 may exit drum 104 through exhaust passage 416. Exhaust air 420 may be moist or humid air that contains the moisture and water exchanged with the articles in drum 104. Exhaust fan 426 draws this air through exhaust passage 416. Exhaust air 420 may combine with the moist or humid air of regeneration exhaust air path 422 to exit dryer 400 through exhaust duct 430.

Thus, dryer 400 may include ducts and a configuration to divert heated air for regenerating desiccant wheel 140, as opposed to air paths. Moreover, a secondary heating element may be placed in duct 414 to increase the heat or temperature of the air within the secondary air path moving through duct 414.

Figure 5:
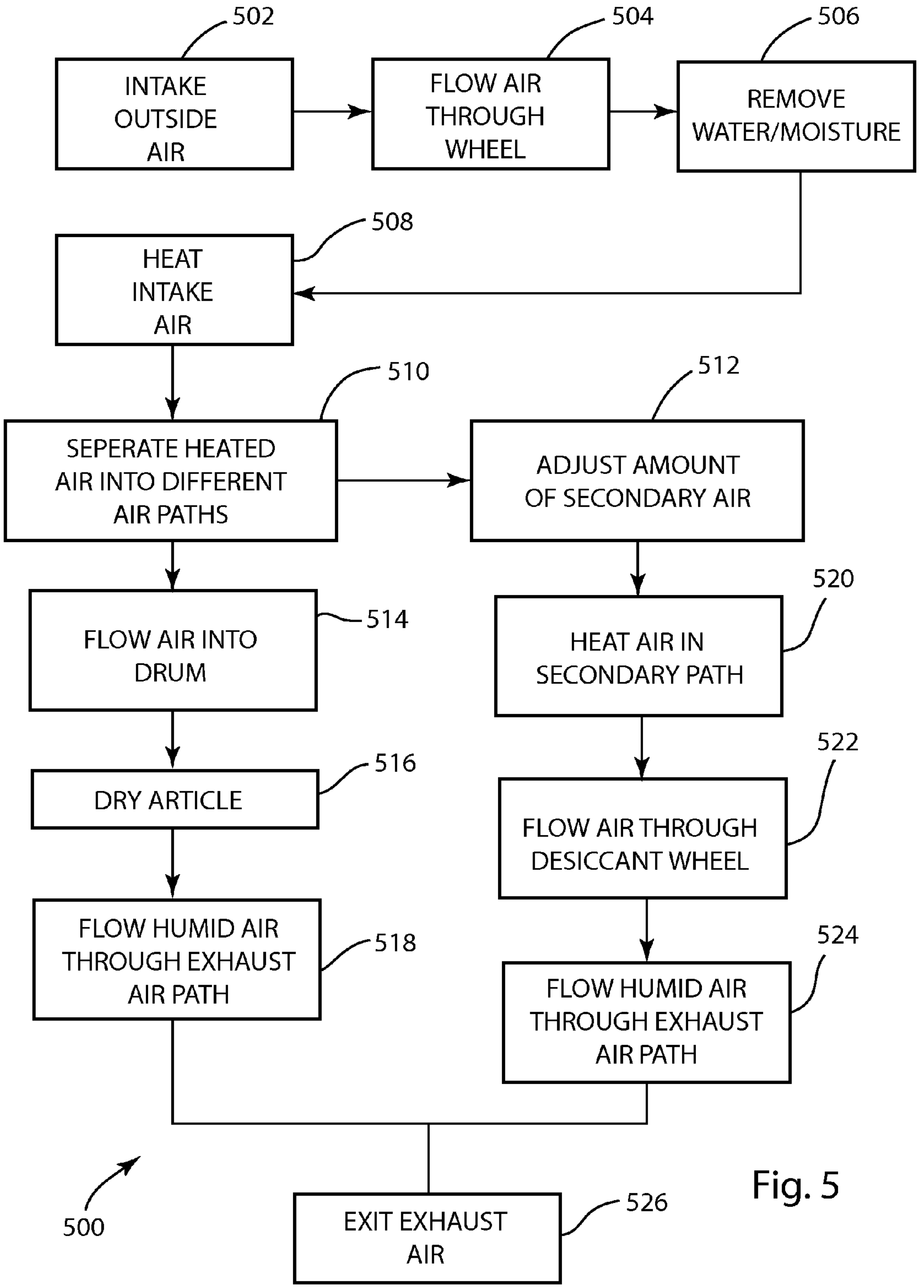
FIG. 5 illustrates a flowchart for drying an article using the disclosed configurations according to the disclosed embodiments.

FIG. 5 depicts a flowchart 500 for drying an article according to the disclosed embodiments. Flowchart 500 shows the steps taken by a drying apparatus to dry an article. The steps may be executed by a processor couple to the various components within the dryer to perform the functions. This process may be coupled to a memory storing instructions to execute the steps. References will be made to applicable components within the dryers disclosed by FIGS. 3 and 4 above for illustrative purposes.

Step 502 executes by taking outside air into a dryer, such as dryer 300 or dryer 400. The air may be from outside the dryer, as the dryer is an open drying system. Step 504 executes by flowing the outside air through desiccant wheel 140. Whether brought in via a duct or a screen, all air brought into the dryer passes through desiccant wheel 140.

Step 506 executes by removing water or moisture from the air by desiccant wheel 140. Desiccant wheel 140 may be positioned in the inlet air path of the incoming air. A portion of the wheel, such as 75%, is exposed to the incoming air. Desiccant wheel 140 may be moved according to a set time period, such as every 5 seconds, or upon instruction from the dryer. Wheel 140 also moves to align the regenerated portion of desiccant from secondary air path into the intake air path.

In step 506, water molecules, or grains of water within the air, are removed by desiccant 144. This action generates dried air 408.

Step 508 executes by heating the intake air after it passes through desiccant wheel 140. Heating element 135 may heat the air to a desired temperature. Because of the low water vapor, heated air 410 is dry and hot. Step 510 executes by separating heated air 410 into different air paths. Thus, some of the dry, hot air will be used to dry articles in drum 104, while the rest will be used to regenerate desiccant wheel 140.

Step 512 executes by adjusting the amount of air going into the secondary air path meant to regenerate desiccant wheel 140. The adjustment may be performed using a damper, or other adjustable means like a flap, wherein the air flow may be partially blocked from entering the secondary air path. Step 512 may be optional, such that no adjustment is made on the air flowing into the secondary air path.

Step 514 executes by flowing heated air 410 into drum 104 to dry article 102. Step 516 executes by drying article 102. The heated air mixes and interacts with article 102 to remove moisture and water. Step 518 executes by flowing the humid or heavy air through the exhaust air path formed by exhaust air passage 416. Preferably, exhaust fan 426 pulls exhaust air 420 from drum 104.

Step 520 executes by heating the air in the secondary air path with secondary heating element 306, if applicable. Referring to FIG. 3, the air used to regenerate desiccant wheel 140 may be further heated to promote regeneration and better water removal capabilities. Alternatively, step 520 may be skipped if no secondary heating element is within the dryer, as shown in FIG. 4.

Step 522 executes by flowing the heated and dried air through desiccant wheel 140 to regenerate desiccant 144. The hot and dry air better removes water from desiccant 144 than using outside air. Preferably, the regeneration air flows in a direction opposite to the intake air flow. Step 524 executes by flowing the humid air off of desiccant wheel 140 through the exhaust air path. Step 526 executes by exiting the exhaust air through duct 430 or 130.

Figure 6:
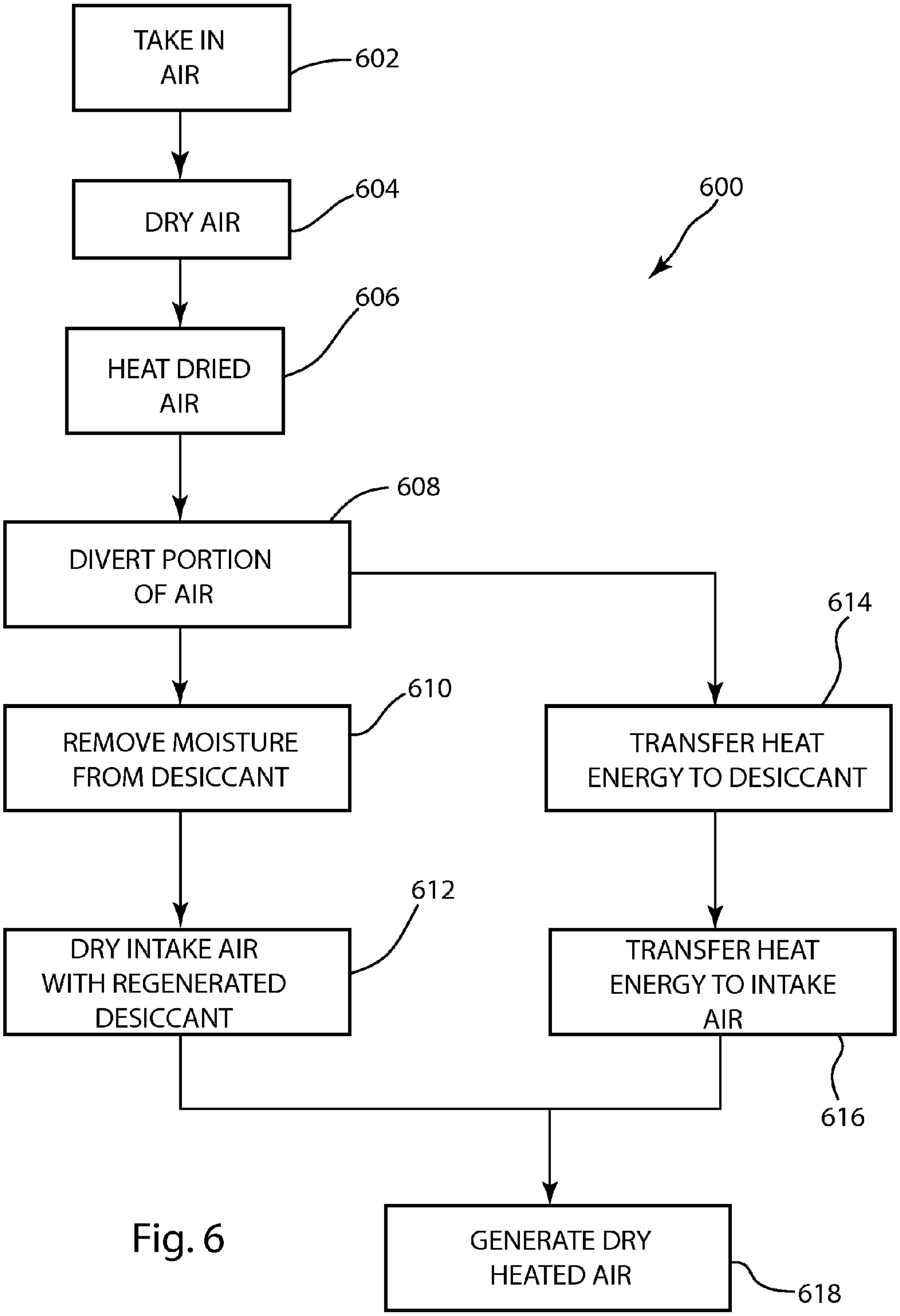
FIG. 6 illustrates a flowchart for recouping or reclaiming heat energy in a drying system according to the disclosed embodiments.

FIG. 6 depicts a flowchart 600 for recouping or reclaiming heat energy in a drying system according to the disclosed embodiments. Preferably, the drying system is an open drying system, as the ones disclosed above, that takes in outside air, dries and heats the air to dry an article 102, and expels the air outside the system. Step 602 executes by taking in air from outside the drying system, such as dryers 300 and 400. Step 604 executes by drying the intake air with desiccant wheel 140, as disclosed above.

Step 606 executes by heating the dried air with heating element 135. Step 608 executes by diverting a portion of the heated and dried air to a secondary air path. These steps may be reversed, such that the intake air is diverted and then heated, such as with heating element 306. These features allow the incoming air to have heat energy applied to it before regenerating desiccant wheel 140.

Step 610 executes by removing moisture from desiccant 144 that has been saturated during normal drying operations. The dried air coming through the secondary air path will better absorb moisture than using ambient air from outside the drying system. Step 612 executes by drying the intake air with the regenerated desiccant 144 when desiccant wheel 140 repositions itself.

Step 614 executes by transferring heat energy from the dried and heated air in the secondary air path to desiccant 144. The heat provided by heating element 135, secondary heating element 306 or both is absorbed by desiccant 144. In addition to being dried by the air in the secondary air path, the regeneration process applies heat as well. Step 616 executes by transferring the heat energy received in step 614 to the intake air coming into the drying system. Thus, the air is heated by the regenerated desiccant 144. This step is disclosed in greater detail below.

Step 618 executes by generating dry, heated air using the regenerated desiccant 144. Step 618 then returns flowchart 600 to step 606 (or possibly step 608) to repeat the process. The result is air diverted into the secondary air path is dryer and hotter than ambient air from outside the drying system. The drier and hotter air regenerates the desiccant wheel, which then recoups or reclaims this energy to apply to incoming air when the wheel repositions itself. This results in even drier and hotter air going through the drying system.

For example, the placement of secondary heating element 306 in this process may result in the air in the secondary air path having a temperature of about 190 degrees Fahrenheit to about 300 degrees Fahrenheit with 1000 watts of power. Desiccant wheel 140 recoups or reclaims this heat during the regeneration process, with about 500 watts going out to dry the desiccant. The remaining energy of the other 500 watts may be applied to the intake process. Thus, a heating process of the intake air that uses 3800 watts may seem like 4300 watts.

This recouping feature is accomplished by using an area of desiccant wheel 140 to dry the air diverted into the secondary air path. A conventional desiccant may use 75% of its area to dry the intake air and 25% to be regenerated. The disclosed process may use 50% of the area of the wheel for drying incoming air used in drying operations, 25% to dry air meant to regenerate the wheel or go into the secondary air path, and 25% to be regenerated by the secondary air path.

For example, air diverted into the secondary air path may have a temperature of 125 degrees Fahrenheit and 15-25 gpp of water. This air is better to regenerate than ambient air having a temperature of 75 degrees and 40-50 gpp. This heat is recouped by the disclosed process and reapplied to the incoming air. The desiccant wheel performs better and provides a more efficient drying system. In this type of drying system, desiccant wheel 140 may be known as an enthalpy wheel because it captures the heat energy provided in the secondary air path, and transfers it to the primary intake air path.

Thus, the disclosed embodiments include a dryer having different configurations to enhance moisture removal from air coming into the dryer. This air may be called ambient air as it has not been treated prior to entering the dryer. The disclosed dryer includes a desiccant wheel that rotates to different positions such that different portions of the wheel are in the paths of incoming and outgoing air. Outgoing air includes air used to regenerate the desiccant within the wheel. A heater may be used to further heat the air used to regenerate the wheel.

The disclosed embodiments preferably are used in an open drying system that has air brought from outside. The outside, or ambient, air is treated by the desiccant to lower the vapor pressure or relative humidity of the incoming air. No matter what the outside air is like, the disclosed dryers lower the vapor pressure to enhance drying. This vapor pressure level is maintained due to regeneration of the desiccant within the wheel.

The disclosed embodiments also may be applicable to other drying processes beyond contemporary dryers. For example, a desiccant wheel may be set up to dry out a room or enclosed space of a building having severe water damage. Air may be pumped, or forced, through an upper portion of the wheel prior to entering the room. Air also is forced out of the room to remove the moisture or water evaporated within the room to outside the building. Much like the outgoing air path disclosed above, this outgoing air serves to transfer heat or energy to the wheel and to regenerate the moisture removal capabilities of the desiccant wheel.

The disclosed embodiments provide a more efficient manner of drying articles within an open drying system. Instead of using ambient air (for example, 75 degrees Fahrenheit, 50% relative humidity with 65 grains per pound or 0.445 vapor pressure), the disclosed three-hole configurations uses the pre-heated and dried air after it cycles through the desiccant wheel to regenerate the desiccant wheel. A separate smaller heating element may be located within the secondary, or regeneration, airstream.

The term "three-hole" configuration is based on the three separate air paths used by a dryer to dry clothes and regenerate the desiccant wheel. As disclosed above, there is a main, or process, intake that flows through the primary heating element onto the drum. The air in this stream is dried and heated. The airflow of this air path would be equal to whatever the current airflow is for the dryer. This main intake airstream has the primary heating element that pulls the majority of the wattage used by the dryer.

The secondary, or reactivation, intake also includes air that flows through the primary heating element, and also is dried and heated like the air in the main intake. Optionally, this air may be heated again with a secondary heating element. This air is directed towards the desiccant wheel to regenerate the wheel. This feature allows more water to be removed from the main intake airstream. The wheel is not regenerated with ambient air, but air that is warmer.

Another air path is the reactivation exhaust that goes through the section of the desiccant wheel to remove water and moisture from the desiccant. As the exhaust airstream picks up the water removed from the ambient intake air, it is sent to be mixed with the main exhaust airstream, or pulled by an exhaust fan to mix. These exhausts are combined before leaving the dryer so that only one exhaust port is needed to exit the dryer.

Thus, the disclosed embodiments may result in higher drum temperatures than a conventional dryer even with similar wattage usage and air flow. This improvement may be achieved by the heat exchange properties of the desiccant wheel as well as the positive feedback loop of the disclosed dryers. By using the heated and dried air to regenerate the desiccant wheel, the disclosed dryer may have a substantial reduction of water and moisture in the air flowing into the drum.

It will be apparent to those skilled in the art that various modifications and variations can be made in the disclosed dryer configurations without departing from the spirit or scope of the invention. Thus, it is intended that the present invention covers the modifications and variations of the embodiments disclosed above provided that the modifications and variations come within the scope of any claims and their equivalents.

What is claimed is:

1. A method for drying an article within an open drying system, the method comprising:

drawing in outside air through a desiccant wheel to generate dried air;

heating the dried air with a heating element to generate heated air;

separating the heated air with an adjusting means to form a secondary air path distinct from a first air path, wherein the first air path is configured to flow to the article; and regenerating the desiccant wheel with the heated air within the secondary air path.

2. The method of claim 1, further comprising heating the heated air within the secondary air path with a secondary heating element.

3. The method of claim 1, further comprising adjusting a portion of the heated air to form the secondary air path.

4. The method of claim 3, wherein the adjusting step includes using a damper as the adjusting means.

5. The method of claim 1, further comprising activating an exhaust fan to pull the heated air within the secondary air path through the desiccant wheel.

6. The method of claim 1, further comprising combining exhaust air used to regenerate the desiccant wheel with exhaust air from a drum within the open drying system.

7. The method of claim 6, further comprising exiting the exhaust air from the desiccant wheel and the drum from the open drying system.

8. A method for operating an open drying system, the method comprising:
- taking in outside air into the open drying system;
- drying the outside air with a desiccant wheel to generate dried air;
- heating the dried air with a heating element to generate heated air;
- separating the heated air into a first air path and a second air path;
- flowing the heated air of the first air path to a drum within the open drying system;
- flowing the heated air of the second air path to an area of the desiccant wheel;
- regenerating the desiccant wheel with the heated air of the second air path; and
- exiting exhaust air from the desiccant wheel from the open drying system.

9. The method of claim 8, further comprising heating the heated air of the second air path with a secondary heating element.

10. The method of claim 9, wherein the secondary heating element uses less power than the heating element.

11. The method of claim 8, further comprising adjusting an amount of the heated air flowing to the second air path.

12. The method of claim 8, wherein the second flowing step includes flowing the heated air of the second air path through the desiccant wheel using an exhaust fan.

13. The method of claim 8, wherein the regenerating step includes removing water or moisture from desiccant within the desiccant wheel.

14. The method of claim 8, further comprising moving the desiccant wheel to position a regenerated portion of the wheel to dry the outside air.

15. A method for recouping heat energy in a drying system, the method comprising:
- taking in air;
- drying the air using desiccant;
- heating the dried air to add heat energy;
- diverting a portion of the dried and heated air to a secondary air path that is distinct from a first air path;
- regenerating the desiccant using the dried and heated air of the secondary air path; and
- transferring the heat energy to the desiccant.

16. The method of claim 15, further comprising transferring the heat energy to incoming air flowing through the desiccant.

17. The method of claim 15, further comprising activating a fan to pull the dried and heated air into the secondary air path.

* * * * *